Dec. 29, 1970  G. E. BARKER  3,551,839

AUTOMATIC RANGING CIRCUITRY

Filed Oct. 14, 1968  2 Sheets-Sheet 1

INVENTOR
GEORGE E. BARKER
BY *Harold C. Walton*
ATTORNEY

INVENTOR
GEORGE E. BARKER
BY Harold Patton
ATTORNEY

United States Patent Office 3,551,839
Patented Dec. 29, 1970

3,551,839
AUTOMATIC RANGING CIRCUITRY
George E. Barker, St. Louis, Mo., assignor to Monsanto Company, St. Louis, Mo., a corporation of Delaware
Filed Oct. 14, 1968, Ser. No. 767,389
Int. Cl. H03f 1/36; H05f 3/34
U.S. Cl. 330—99                                   9 Claims

ABSTRACT OF THE DISCLOSURE

An electronic automatic ranging circuit including a non-inverting amplifier cascade-coupled to a single-ended differential amplifier, which in turn is cascade-coupled to a second single-ended differential amplifier. One input of the non-inverting amplifier is coupled to a source of input signals having a wide dynamic range and the inverting inputs of each single-ended amplifier are biased to cut-off for input signals less than a predetermined value. Each of the amplifiers in the cascaded chain has a different gain and feedback is supplied from their output terminals to the other input of the non-inverting amplifier. Each single-ended amplifier produces an output only when its input is greater than the biasing potential applied to it. Means are provided for monitoring the outputs of each amplifier and thereby provide an amplified signal corresponding to the input signal of interest.

FIELD OF THE INVENTION

The present invention relates generally to automatic electronic ranging circuitry, and more particularly to automatic ranging circuitry adapted for use with a gas chromatograph, or like instrument, and having the ability to process a wide range of signals which are to be detected and displayed.

BACKGROUND OF THE INVENTION

In the field dealing with the processing and display of electrical signals having an extremely wide dynamic range (for example, where $10^5$ to $10^6$ is the ratio of the highest-signal voltage to the lowest-signal voltage), it is difficult to employ conventional linear amplifiers to process all possible signals within the range without undue distortion. Typical of the situation described is that of monitoring and displaying the output of a gas chromatograph, whose low-level output signals may be as small as 2–3 microvolts and whose high-level output signals may be in the range of a couple of volts or more. In monitoring and processing the output signals of the gas chromatograph, it is highly desirable to detect and display all signals generated on a single display device (such as a strip chart recorder or a computer printout). However, in dealing with such a wide dynamic range of output signals, it is difficult to use a single display device to detect and display all of the signals without distorting or even entirely eliminating some of the signals. For example, it may be necessary to amplify low level signals to detect their presence, yet similar amplification of larger signals may drive the pen of a recorder completely off scale; thus, the need for appropriate ranging circuitry.

DESCRIPTION OF THE PRIOR ART

Heretofore the conventional method of dealing with input signals having a wide dynamic range has been to apply the signals to an attenuator circuit consisting of a variable voltage divider which is either manually or automatically adjusted in accordance with the magnitude of the input signal. The voltage dividing ratio is selected for the particular input signal to be observed, so that an amplifier which is to process the input signal is operated in the region of, but below, saturation. Oftentimes the voltage dividers used in conventional attenuation circuits consist of a series of relays and switches which are actuated either manually or by means of digital logic. Although these conventional attenuator circuits have served the general purpose, they have not proved satisfactory under all conditions of service for the reasons that (1) they are a source of both mechanical and electrical noise, (2) they are somewhat limited in their switching speed and therefore not particularly suitable for use with high speed electronic apparatus such as computers), and (3) they require a substantial amount of maintenance for proper operation over long periods of use.

SUMMARY OF THE INVENTION

The general purpose of this invention is to provide automatic electronic ranging circuitry which embraces all of the advantages of similarly employed auto-ranging circuitry, yet does not possess the aforedescribed disadvantages attendant with circuits which employ relays and mechanical switches. To attain this, the present invention utilizes a unique combination or chain of operational amplifiers, whose output signals respond in a prescribed manner to selected portions of an input signal range, thereby to provide an automatic ranging function.

An object of the present invention is the provision of a novel automatic ranging circuit which is capable of detecting, amplifying, and processing signals having a wide dynamic range.

Another object is to provide an automatic ranging circuit compatible with high speed apparatus such as data processing equipment, yet is free of relays or other mechanical devices susceptible to noise generation.

A further object of the present invention is the provision of an automatic ranging circuit for quantizing a chromatograph output signal, so that it can be either transmitted substantially free of distortion over long distances or converted to an analog signal and displayed in close proximity to the chromatograph.

In the present invention these purposes (as well as others apparent herein) are achieved generally by providing a plurality of cascaded operational amplifiers, one amplifier being a conventional non-inverting amplifier having a high input impedance. The non-inverting amplifier is adapted to receive at one of its input terminals a signal having a wide dynamic range, for example, a gas chromatograph output signal. The non-inverting amplifier is cascade-coupled to a single-ended amplifier having a gain less than that of the non-inverting amplifier and to which is applied a predetermined biasing potential. The biasing potential maintains the single-ended amplifier in its cutoff condition until the output signal from the non-inverting amplifier exceeds the value of the biasing potential. A second single-ended amplifier, biased in the same manner, is cascade-coupled to the other single-ended amplifier. The output terminal of each of the amplifiers is feedback-coupled to the inverting input terminal of the non-inverting amplifier. Means are connected to the output terminals of each of the amplifiers to detect said outputs and reconstruct therefrom a signal indicative of the magnitude of the input signal applied to the non-inverting amplifier.

BRIEF DESCRIPTION OF THE DRAWINGS

Utilization of the invention will become apparent to those skilled in the art from the disclosures made in the following description of a preferred embodiment of the invention as illustrated in the accompanying drawings, in which.

DESCRIPTION OF PREFERRED EMBODIMENTS

Figure 1:
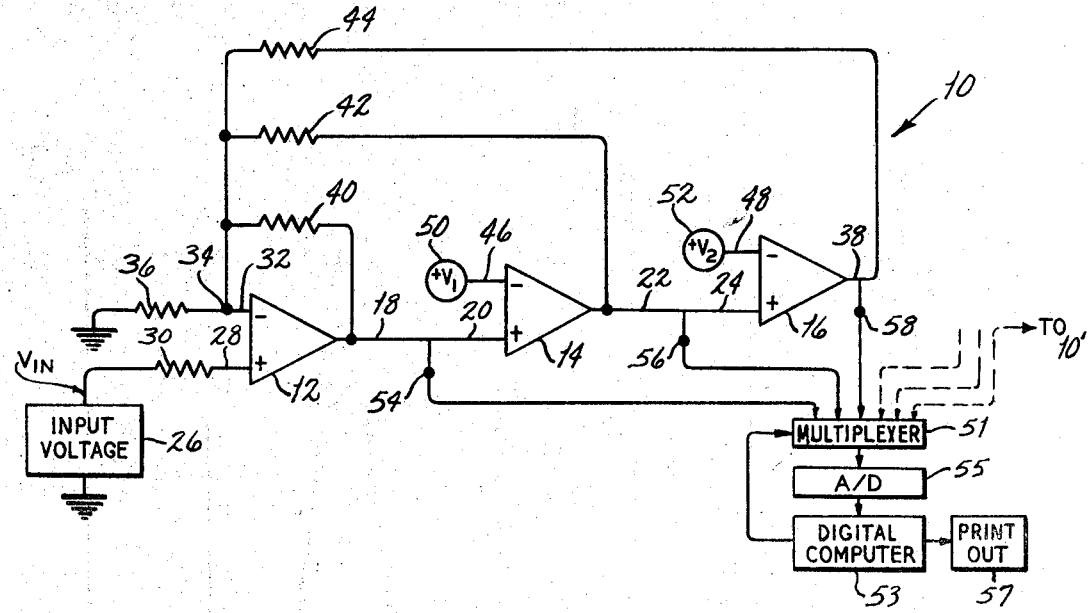
FIG. 1 is a diagrammatic representation of a preferred embodiment of the automatic ranging circuitry of the present invention.

Referring now to the drawings, wherein like reference characters designate like or corresponding parts throughout the several views, there is shown in FIG. 1 a diagrammatic circuit diagram of an automatic ranging circuit (auto-ranging circuit), generally designated 10. The automatic ranging circuit 10 includes a chain of three cascade-coupled operational amplifiers 12, 14, and 16; it being understood that more than three operational amplifiers could be used, if connected in the manner to be described hereinafter. The operational amplifier 12 serves as the input amplifier for the auto-ranging circuit 10 and is connected in the conventional non-inverting fashion; i.e., its inverting input terminal 32 is coupled to receive a feedback signal and its non-inverting input terminal is coupled to receive the input signals to be processed by the auto-ranging circuit 10. The amplifier 12 shall be referred to herein as the non-inverting operational amplifier 12. The operational amplifiers 14 and 16 are connected to function as single-ended, differential amplifiers and will be referred to herein as the single-ended operational amplifiers 14 and 16. That is, their non-inverting input terminals receive the information signal, and their inverting input terminals are connected to cut-off reference or biasing potentials.

The operational amplifiers 12, 14 and 16 are interconnected in the well-known cascade fashion; the output terminal 18 of the amplifier 12 is connected to the non-inverting input terminal 20 of the single-ended operational amplifier 14 and the output terminal 22 of the amplifier 14 is connected to the non-inverting input terminal 24 of the amplifier 16. Each of the operational amplifiers 12, 14 and 16 may be integrated circuit, operational amplifiers, such as those designated Operational Amplifier 709 and commercially available from Fairchild Semiconductor.

A source of input signals is shown at 26. This source 26 may take the form of a gas chromatograph which generates an output signal having a wide dynamic range; for example, a ratio of highest-to-lowest voltage ratio of from $10^5$ to $10^6$. A typical waveform of a gas chromatograph is shown by the graphic representation of FIG. 2; the signal portion $p$ representing a low-level signal and the signal portion $p'$ representing a high-level signal.

The source of input signals 26 is shown coupled to the non-inverting input terminal 28 of the non-inverting operational amplifier 12 by means of an input resistor 30. The inverting input terminal 32 of the operational amplifier 12 is connected to a current-summing node or junction point 34, which in turn is coupled to a reference potential (ground potential) by means of a resistor 36.

The output terminals 18 and 22 of the operational amplifiers 12 and 14, respectively, as well as the output terminal 38 of the operational amplifier 16, are feedback-coupled to the inverting input terminal 32 of the operational amplifier 12 by means of feedback resistors 40, 42 and 44, respectively.

The inverting input terminals 46 and 48 of the single-ended operational amplifiers 14 and 16 are electrically connected to cut-off reference potential sources 50 and 52, respectively, having values designated $+V_1$ and $+V_2$.

The output terminals 18, 22 and 38 of the operational amplifiers 12, 14 and 16 are shown connected to output terminals 54, 56 and 58 of the auto-ranging circuit 10. These output terminals 54, 56 and 58 may be coupled to a conventional multiplexer 51 similarly coupled to other auto-ranging circuits, designated 10' as represented by the dashed lines in FIG. 1. The multiplexer 51 may be controlled by a digital computer 53 for the purpose of selectively accessing the output terminals 54, 56 and 58 of the auto-ranging circuits 10 and 10' and delivering the accessed signals to the analog-to-digital (A/D) converter 55. The A/D converter 55 converts the analog signals at output terminals 54, 56 and 58 in the order selected by the computer 53 and delivers corresponding digital signals to the computer 53 for further processing, in a manner to be more fully described hereinafter. The computer 53 may be associated with a printer 57, recorder, or other display apparatus for displaying the value of the input signal.

OPERATION OF FIG. 1 CIRCUITRY

The non-inverting input amplifier 12 may be considered to be the main amplifier of the auto-ranging circuit 10. It is chosen to present a high input impedance to the information input signals applied thereto by means of the source of input signals 26. Preferably, the input resistance 30 is chosen such that its value ($R_{30}$) is equivalent to the value of the parallel combination of the resistors 36, 40, 42 and 44, i.e.:

$$\frac{1}{R_{30}} = \frac{1}{R_{36}} + \frac{1}{R_{40}} + \frac{1}{R_{42}} + \frac{1}{R_{44}}$$

Assuming that the input signal provided by the source of input signals 26 has a value $V_{in}$, the operational amplifier 12 will provide a voltage signal $V_{18}$ at its output terminal 18 having the following relationship:

$$V_{18} = \frac{R_{40}}{R_{30}} V_{in} \quad (1)$$

where $R_{40}/R_{30}$ is the gain of amplifier 12. The feedback from the output terminal 18 to the summing code 34 serves to balance the input signals at input terminals 32 and 28 and thereby causes the voltage signal $V_{18}$ to follow the input signal in the well-known, characteristic operation of operational amplifiers.

If the magnitude of the signal $V_{18}$ appearing at the output terminal 18 of operational amplifier 12 is less than the cut-off biasing voltage $+V_1$ applied to the inverting input terminal 46 of the amplifier 14, the amplifier 14 will remain in its cut-off condition. It follows, therefore, that the amplifier 16 will also remain in its cut-off condition. This means that the only output of the auto-ranging circuit 10 for input signals $V_{in}$ less than $$\frac{R_{30}}{R_{40}} V_1$$

will be from output terminal 54, and its value will correspond to the input signal as expressed by the relationship of Equation 1 above.

However, when the output signal $V_{18}$ is greater than $+V_1$, then the amplifier 14 will cut-in and provide a feedback signal by means of feedback resistor 42 to the summing node 34. Because of the high gain of amplifier 14, this feedback signal serves to clamp the output voltage $V_{18}$ of the amplifier 12 at the value $+V_1$, and any further increase in the value of the input voltage $V_{in}$ results in a corresponding (linear) increase in the output voltage $V_{22}$ of the amplifier 14 to balance the input signals to the input amplifier 12. The output voltage signal $V_{22}$ of the single-ended amplifier 14 follows the input signal $V_{in}$ once it reaches a level sufficient to cause the output voltage $V_{18}$ to exceed the biasing potential $V_1$. Thus, by monitoring the output terminals 54 and 56 of the auto-ranging circuit 10 and observing that the voltage signal at output terminal 54 is at its "clamped" level ($+V_1$) while the voltage signal at output terminal 56 is below its "clamped" level, then it is apparent that the input signal $V_{in}$ may be determined from the following relationship:

$$V_{22} = V_{in}\frac{R_{42}}{R_{30}} - V_1\frac{R_{42}}{R_{40}} \quad (2)$$

and is in the range:

$$\frac{R_{30}}{R_{40}}V_1 + \frac{R_{40}}{R_{42}}V_2 > V_{in} > \frac{R_{20}}{R_{40}}V_1 \quad (3)$$

Since the respective gains of amplifiers 12 and 14 are known, the input signal $V_{in}$ may be determined from the value of the combination of the clamped voltage signal $V_{18}$ and the output signal $V_{22}$, as will be more fully described hereinafter.

If the magnitude of the voltage signal $V_{22}$ appearing at the output terminal 22 of the amplifier 14 becomes greater than the biasing voltage $+V_2$, the amplifier 16 will turn on. This condition occurs when the input voltage $V_{in}$ reaches the range defined by the following relationship:

$$V_{in} > \frac{R_{30}}{R_{40}}V_1 + \frac{R_{30}}{R_{42}}V_2 \quad (4)$$

This means that the value of the input signal $V_{in}$ to the auto-ranging circuit 10 may be determined by observing the value of the signals at output terminals 54, 56 and 58. The ouput signals $V_{18}$ and $V_{22}$ at output terminals 54 and 56 will be clamped at values of $+V_1$ and $+V_2$, respectively, because of the higher gain of amplifier 16 and its feedback by means of resistor 44 to the summing node 34 of the input amplifier 12. By observing that the outputs of amplifiers 12 and 14 are clamped, it is apparent that the input signal $V_{in}$ is greater than $$\frac{R_{30}}{R_{40}}V_1 + \frac{R_{30}}{R_{42}}V_2$$

Since the gains of amplifiers 12, 14 and 16 are known, the actual value of the input signal $V_{in}$ may be determined from the value of the combination of the clamped voltages $V_{18}$, $V_{22}$ and the output signal $V_{38}$ from amplifier 16.

To better understand the operation of the auto-ranging circuit 10, some typical values for the gains of amplifiers 12, 14 and 16, the reference potentials $V_1$ and $V_2$, and the input signal P' will be assumed and the operation described with reference to the waveforms of FIGS. 2 and 3. For example, assume that the gain of amplifier 12 to 1,000, the gain of amplifier 14 is 100, and the gain of amplifier 16 is 10. Further assume that the values of the biasing potentials supplied by reference potential sources 50 and 52 are each one volt positive, and that the output signals of amplifiers 12 and 14 range between 0 and 1 volt, while the output signal of the amplifier 16 ranges between 0 and 10 volts. This means that for input signals $V_{in}$ ranging from zero to one millivolt, the output of operational amplifier 12 will range between zero and one volt; for input signal $V_{in}$ ranging between one and 11 millivolts, the output voltage $V_{22}$ of amplifier 14 will range from zero to one volt; and for input voltages ($V_{in}$) ranging from 11 to 111 millivolts, the output voltage $V_{38}$ of amplifier 16 will range between zero and ten volts.

Figure 2:
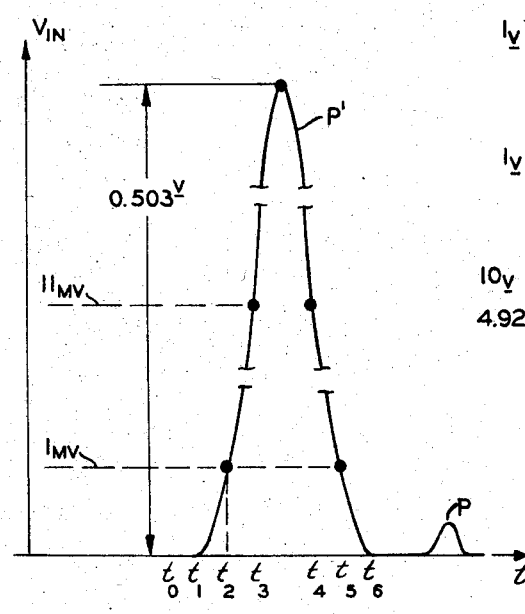
FIG. 2 is a graphical representation of a typical output signal from a gas chromatograph, which signal may be readily processed by the circuitry of FIG. 1.
Figure 3:
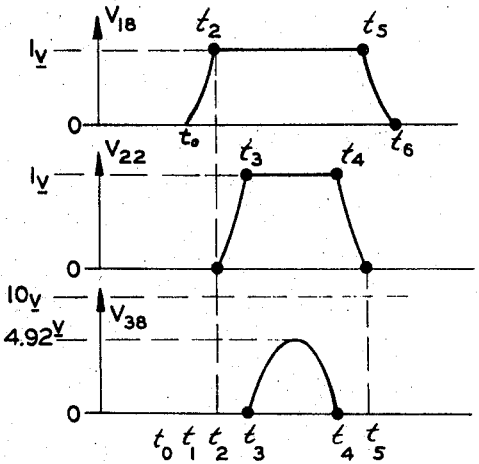
FIG. 3 is a graphical representation of the output signals taken from the circuitry of FIG. 1; when the input signal thereto takes the form of a portion of the signal of FIG. 2.

Referring now to the high level signal portion p' of FIG. 2, and assuming that this signal is applied to the input terminal 28 of the amplifier 12, it may be observed that at $t_0$ (before high-level signal portion p' begins to rise), all of the output signals $V_{18}$, $V_{22}$ and $V_{38}$ of the amplifiers 12, 14 and 16, respectively, are at their reference or base level, indicated at zero (0) in FIG. 3. At time $t_1$ the high-level signal portion p' begins to rise, and the output signal $V_{18}$ of amplifier 12 follows the input signal $V_{in}$ until it reaches its maximum or clamping voltage ($+V_1$) of one volt at time $t_2$. The input signal $V_{in}$ at time $t_2$ is one millivolt and further that the output voltages $V_{22}$ and $V_{38}$ of amplifiers 14 and 16 have remained at their reference levels (zero volts) during the time period $t_1$ to $t_2$.

As the high-level input signal portion p' continues to rise from one millivolt, the output voltage $V_{22}$ associated with amplifier 14 begins to rise from its reference level (zero volts) and follow it to its maximum one volt level which is reached at time $t_3$. It should be observed that the voltage signal $V_{22}$ rises at a slower rate (less slope) compared to the rise of output voltage $V_{18}$ during the time period $t_1$ to $t_2$. This is due to the fact that the gain of amplifier 12 was chosen to be 1,000, whereas the gain of amplifier 14 was chosen to be 100. Further, it should be noted that the output voltage $V_{18}$ of the amplifier 12 remains clamped at the one volt level during the time period $t_2$ to $t_3$. The magnitude of the input voltage at time $t_3$ is 11 millivolts as may seen from FIG. 2.

As the high-level input signal portion p' continues to rise from its 11 millivolt level to its peak level of .503 volt, the output signals $V_{18}$ and $V_{22}$ associated with amplifiers 12 and 14 remain clamped at their maximum one volt level. However, the amplifier 16 cuts in or turns on, and its output voltage $V_{38}$ follows the input signal p' to a peak of 4.92 volts and continues to follow the input signal $V_{in}$ until it again falls to the 11 millivolt level at time $t_4$. At time $t_4$ the output signal $V_{38}$ of amplifier 16 has returned to its base level (zero volts), and the output signal $V_{22}$ of amplifier 14 follows the input signal p' downwardly to its base level (zero volts) at time $t_5$. At time $t_5$ the input signal $V_{in}$ or p' again corresponds to a value of 11 millivolts, and the amplifier 12 begins to follow it downwardly to its base level (zero volts) at time $t_6$.

It should be noted that the output signal $V_{38}$ of amplifier 16 peaked at a value of 4.92 volts, as may be observed from FIG. 3.

In many applications of my auto-ranging circuit 10, it is desirable to determine the peak voltage p' of an input signal ($V_{in}$). In the example described this may be accomplished by accessing the output voltages $V_{18}$, $V_{22}$, and $V_{38}$ by means of the computer 53 and multiplexer 51 at the time that the input voltage $V_{in}$ or p' reaches its peak. In the example given above, the output voltages $V_{18}$ and $V_{22}$ of amplifiers 12 and 14 are one each volt at this critical time, and the output voltage $V_{38}$ of amplifier 16 is 4.92 volts. These analog signals are converted to digital signals by means of the analog-to-digital converter 55 and delivered to the computer 53. With this instantaneous signal information and knowing that the predetermined gains of the amplifiers 12, 14 and 16 were 1,000, 100 and 10, respectively, then the computer 53 can calculate and print out the input voltage ($V_{in}$) from the following relationship:

$$V_{in} \text{ (mv.)} = 100\ V_{38} + 10\ V_{22} + V_{18}$$

Substituting the signal values observed at the time the input signal p' peaked, this equation becomes:

$$V_{in} \text{ (mv.)} = 100\ (4.92) + 10\ (1) + 1$$

or $$V_{in} = .503 \text{ volt}$$

Figure 4:
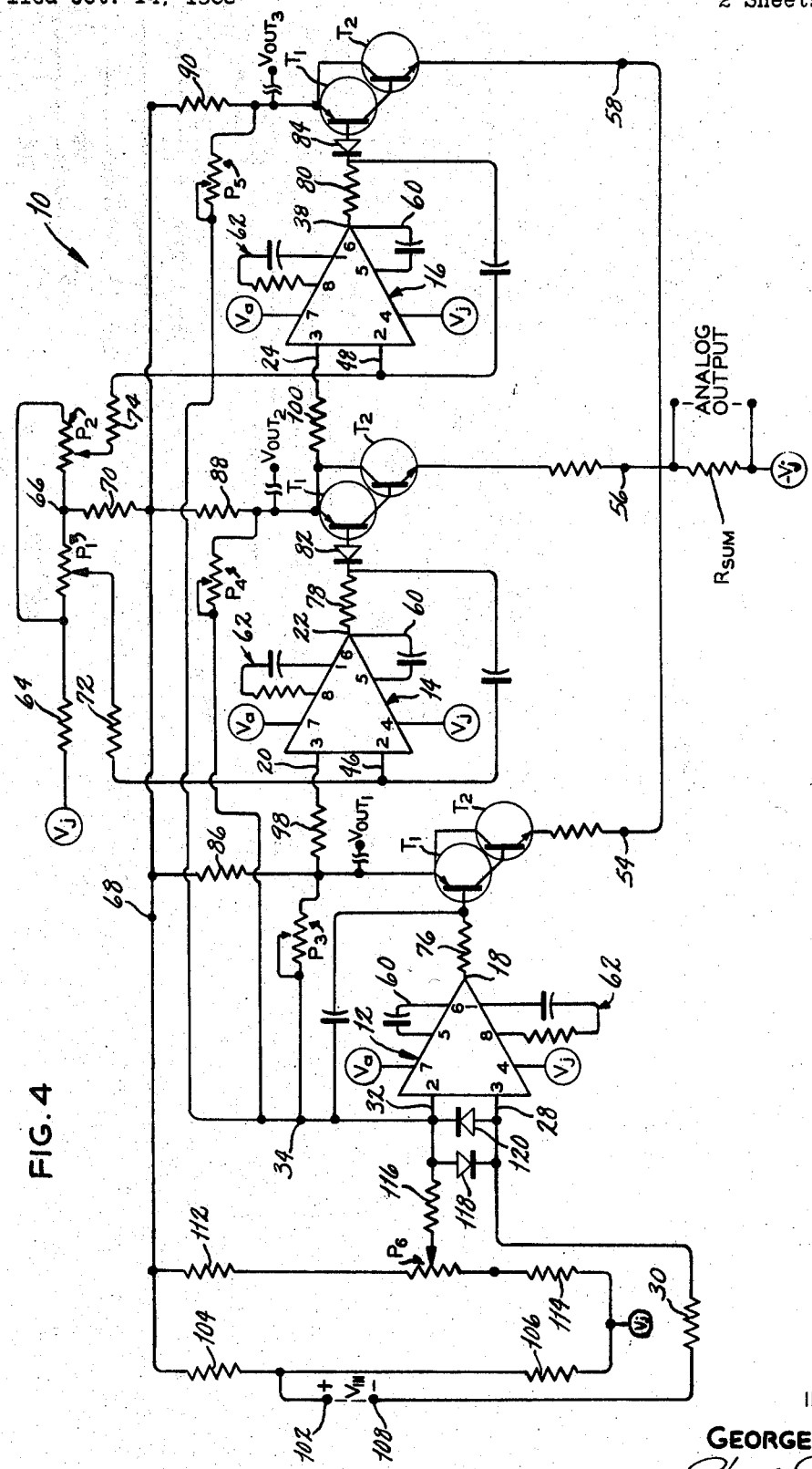
FIG. 4 is a schematic circuit drawing of the circuitry of FIG. 1 wherein an analog output signal may be generated for display, or wherein low-impedance quantized voltage signals may be generated for transmission of the output signal over long distances.

Referring now to FIG. 4, there is shown a schematic diagram of a preferred embodiment of my auto-ranging circuit 10. The auto-ranging circuit 10 of FIG. 4 is shown as comprised of three operational amplifiers 12, 14 and 16 of the Fairchild Semi-conductor 709 type. These operational amplifiers each have eight pin contacts, specified 1 through 8. The number 2 pin serves as the inverting input terminal and the number 3 pin serves as the non-inverting input terminal. The pin designated 6 serves as the output terminal, while pins 4 and 7 are power supply terminals and are connected to reference potentials indicated as $V_a$ and $V_j$. A capacitor 60 is shown interconnecting the pins 5 and 6 of each amplifier 12, 14 and 16, and a resistor-capacitor combination, designated 62, is shown interconnecting pins 1 and 8 of each amplifier.

Two potentiometers $P_1$ and $P_2$ are shown coupled to the reference potential $V_j$ by means of a resistor 64. The common junction 66 between the two potentiometers $P_1$ and $P_2$ is connected to a bus terminal 68 by means of a resistor 70. The wiper arm of potentiometer $P_1$ is connected to the inverting input terminal 46 of the amplifier 14 by means of a resistor 72, and supplies the biasing potential $+V_1$, referred to hereinabove, thereto. Similarly, the wiper arm from potentiometer $P_2$ is connected to the inverting input terminal 48 of the amplifier 16 by means of a resistor 74, and supplies the biasing potential $+V_2$, referred to hereinabove, thereto.

Each of the amplifiers 12, 14 and 16 have their output terminals 18, 22 and 38 coupled to a conventional Darlington pair circuit, consisting of a pair of transistors, $T_1$ and $T_2$, each operating in their common emitter mode. The amplifier 12 is coupled to its Darlington pair circuit by means of a resistor 76, and the amplifiers 14 nd 16 are coupled to their respective Darlington pairs by means of the series combination of resistors 78, 80 and diodes 82, 84, respectively.

The base electrode of the transistor $T_1$ of each Darlington pair circuit is coupled to the output terminal (i.e. terminals 18, 22 and 38) of the operational amplifier with which it is associated. The collector electrode of each transistor $T_1$ is connected to the base electrode of the other transistor $T_2$ of the pair, and the collector electrode of transistor $T_2$ and the emitter electrode of the transistor $T_1$ of the respective transistor pairs are coupled to the bus terminal 68 by means of resistors 86, 88 and 90. The emitter electrodes of the transistors $T_2$ of the respective Darlington pairs are coupled to output terminals 54, 56 and 68 of the auto-ranging circuit 10.

The emitter electrode of the transistor $T_1$ associated with amplifier 12 is coupled to the non-inverting input terminal 20 of the amplifier 14 by means of a resistor 98, and further feedback-coupled to the inverting input terminal 32 of the amplifier 12 by means of a potentiometer $P_3$. Similarly, the emitter electrode of the transistor $T_1$ associated with the amplifier 14 is coupled to the non-inverting input terminal 24 of amplifier 16 by means of a resistor 100, and further feedback-coupled to the inverting input terminal 32 of the amplifier 12 by means of a potentiometer $P_4$. The emitter electrode of the transistor $T_1$ associated with amplifier 16 is feedback-coupled to the inverting input terminal 32 of the amplifier 12 by means of a potentiometer $P_5$.

One input terminal 102 of the auto-ranging circuit 10 of FIG. 4 is connected to a junction between two resistors 104 and 106, which resistors form a voltage divider between the bus terminal 68 and ground potential. The other input teminal 108 is coupled to the non-inverting input terminal 28 of the amplifier 12 by means of the input resistor 30.

A second voltage divider between the bus terminal 68 and ground potential is formed by means of resistors 112, 114 and potentiometer $P_6$. The wiper arm of the potentiometer $P_6$ is coupled to the inverting input terminal 32 of amplifier 12 by means of a resistor 116. Oppositely-poled, protection diodes 118 and 120 are connected between the inverting and non-inverting input terminals (32, 38) of the amplifier 12 to limit the input signal applied thereto.

It should be noted that the potentiometers $P_3$, $P_4$, $P_5$, and $P_6$ of FIG. 4 correspond to the resistors designated 40, 42, 44 and 36 of FIG. 1.

The overall operation of the auto-ranging circuitry of FIG. 4 is similar to that described with reference to FIG. 1. However, the Darlington transistor pair circuits provided in the output circuit of each of the amplifiers 12, 14 and 16 serve to convert the output voltage signals of each amplifier into current signals which can be combined or summed at a resistor $R_{sum}$ connected to the output terminals 54, 56 and 58. This provides an analog voltage signal across the resistor $R_{sum}$ which can be calibrated to correspond to the input signal $V_{in}$. In the alternative low impedance voltage signals $V_{out1}$, $V_{out2}$ and $V_{out3}$ may be taken from the emitter-terminals of the transistors $T_1$ of the respective Darlington pair circuits where it is desirable to transmit the output signals from circuit 10 over long distances. The circuit may be installed in close proximity to a gas chromatograph located remotely at a plant location, while the output terminals $V_{out}$ may be carried as far as several thousand feet to be located in a control room. This voltage transmission allows along transmission without serious deterioration of the information signals.

It should be understood that the current signals transmitted to the output terminals 54, 56 and 58 at the control room may be combined in a manner described in reference to the operation of the auto-ranging circuit of FIG. 1 to provide an indication of the input signal applied to the input terminals 102 and 108 rather than using a current summing resistor.

Many modifications and variations of the present invention are possible in view of the above teachings. For example, a conventional resistor ladder of appropriate resistor combinations may be employed to combine the output signals from each operational amplifier into a single voltage signal corresponding to the value of the unknown input signal ($V_{in}$), rather than employing a digital-to-analog conversion and using a digital computer to calculate it. Therefore, it is to be understood, that the invention may be practiced otherwise than as specifically described.

I claim:
1. Automatic ranging circuitry, comprising
   a source of input signals,
   a first reference potential,
   a plurality of cascaded operational amplifiers, one of said amplifiers having a first and second input terminal electrically coupled to said source of input signals and said first reference potential, respectively,
   each of said other amplifiers having two input terminals and an output terminal, one input terminal of each connected to a reference potential source having values differing from that of said first reference potential, whereby said reference potential source biases each respective amplifier to cut-off until the input sinal to its other input terminal exceeds the values of its cut-off biasing potential, and
   the output terminals of each of said plurality of said operational amplifiers being coupled by means of feedback impedances to said second input terminal of said one operational amplifier.

2. The circuitry as defined in claim 1, wherein each of said plurality of cascaded operational amplifiers has a different gain.

3. The circuitry as defined in claim 2, together with means electrically coupled to said output terminals of each of said cascaded operational amplifiers for combining the output signals in such a manner as to provide a single analog signal corresponding to the value of the input signal applied to said one amplifier by said source of input signals.

4. The circuitry as defined in claim 2, wherein the gain of each cascaded operational amplifier along the signal path is less than that of the preceding operational amplifier.

5. The circuitry as defined in claim 2, together with means electrically coupled to said output terminals of each of said cascaded operational amplifiers for converting the output signals therefrom into low-impedance voltage signals,
   whereby said low-impedance voltage signals may be transmitted substantially free of distortion over long distances.

6. Automatic ranging circuitry, comprising
   a first reference potential,
   a first operational amplifier having a predetermined gain, inverting and non-inverting input terminals, and an output terminal coupled to said inverting input terminal by a first impedance, said inverting input terminal further coupled to said first reference potential by a second impedance, a source of input signals, a third impedance coupling said source of input signals to said non-inverting terminal of said first operational amplifier, a second reference potential having a predetermined value differing from that of said first reference potential, and a second operational amplifier having a gain less than that of said first operational amplifier, inverting and noninverting input terminals, and an output terminal, said output terminal of said second operational amplifier being coupled to said inverting input terminal of said first operational amplifier by a fourth impedance, said non-inverting input terminal of said second operational amplifier being electrically connected to said output terminal of said first operational amplifier, said inverting input terminal of said second operational amplifier being electrically connected to said second reference potential, whereby said second operational amplifier is cut-off for input signals resulting in a signal at the output terminal of the first operational amplifier having a value less than that of said second reference potential and is turned on for input signals resulting in a signal at said output terminal of said first operational amplifier having a value greater than that of said second reference potential.

7. The circuitry as defined in claim 6, wherein said third impedance has a value substantially equivalent to the parallel combination of said first, second, and fourth impedances.

8. The circuitry as defined in claim 6, together with means electrically coupled to said output terminals of each of said operational amplifiers for combining their output signals to provide a single analog signal corresponding to the value of the input signal applied to said first operational amplifier by said source of input signals.

9. Automatic ranging circuitry for use with a chromatograph or the like, comprising a first operational amplifier having a predetermined gain, an output terminal, and two input terminals, a source of chromatograph output signals electrically coupled to one of said input terminals of said first operational amplifier, a first reference potential electrically coupled to the other input terminal of said first operational amplifier by means of a first impedance, the output terminal of said first operational amplifier being coupled to said other input terminal thereof by means of a feedback impedance, a second operational amplifier having a gain differing from that of said first operational amplifier, two input terminals, and an output terminal, said output terminal being electrically coupled to said other input terminal of said first operational amplifier by means of a second feedback impedance, the output terminal of said first operational amplifier being electrically connected to said first input terminal of said second amplifier, and said second input terminal of said second amplifier being coupled to a second reference potential having a predetermined value differing from that of said first reference potential.

References Cited

UNITED STATES PATENTS

| | | | |
|---|---|---|---|
| 2,935,695 | 5/1960 | Wlasuk | 330—99X |
| 3,133,242 | 5/1964 | Harries | 323—22 |
| 3,252,105 | 5/1966 | Patchell | 330—99X |

NATHAN KAUFMAN, Primary Examiner

U.S. Cl. X.R.

330—24, 17, 26, 30